US012703554B1

(12) United States Patent
Keiser

(10) Patent No.: US 12,703,554 B1
(45) Date of Patent: Aug. 11, 2026

(54) FLEXIBLE POUCH HAVING A NOZZLE

(71) Applicant: August Keiser, Cincinnati, OH (US)

(72) Inventor: August Keiser, Cincinnati, OH (US)

( * ) Notice: Subject to any disclaimer, the term of this patent is extended or adjusted under 35 U.S.C. 154(b) by 0 days.

(21) Appl. No.: 17/975,991

(22) Filed: Oct. 28, 2022

Related U.S. Application Data

(60) Provisional application No. 63/347,312, filed on May 31, 2022.

(51) Int. Cl.
*B65D 75/58* (2006.01)
*B05B 11/04* (2006.01)
*B65D 75/00* (2006.01)
*B65D 75/30* (2006.01)
*B65D 75/56* (2006.01)

(52) U.S. Cl.
CPC ........ *B65D 75/5883* (2013.01); *B05B 11/048* (2013.01); *B65D 75/008* (2013.01); *B65D 75/30* (2013.01); *B65D 75/56* (2013.01); *B65D 2575/586* (2013.01)

(58) Field of Classification Search
CPC .. B65D 75/5883; B65D 75/008; B65D 75/30; B65D 75/56; B65D 2575/586; B05B 11/048
USPC ........................................................ 383/42
See application file for complete search history.

(56) References Cited

U.S. PATENT DOCUMENTS 560,984 A * 5/1896 Funk ........................ B65D 1/32 222/215
2,380,513 A 7/1945 Garabedian
2,748,047 A * 5/1956 Kuss .................. B29C 66/8322 156/92
3,255,923 A * 6/1966 Soto ........................ A61J 9/008 206/229
4,428,500 A 1/1984 Kohler
4,512,463 A 4/1985 Ward
4,624,413 A * 11/1986 Corsette .............. B05B 11/1011 239/461
5,004,123 A * 4/1991 Stoody .................. B05B 11/026 222/105
5,083,683 A 1/1992 Knickerbocker
5,114,044 A * 5/1992 Spanek, Jr. .......... A21C 15/005 383/906
5,307,955 A * 5/1994 Viegas ............... B65D 47/2031 222/173
5,863,131 A * 1/1999 Nakamura ......... B65D 75/5883 383/906
6,273,307 B1 * 8/2001 Gross ................. B65D 75/5883 220/613
6,547,166 B1 4/2003 Heren
6,598,808 B1 * 7/2003 Garcia ............... B65D 75/5883 239/326
7,048,156 B2 5/2006 Weck
D560,122 S * 1/2008 Fuchs ............................ D9/708
D581,808 S * 12/2008 Schwartz ....................... D9/708
8,413,857 B2 * 4/2013 Johnson ............. B65D 75/5877 222/105
(Continued)

*Primary Examiner* — Peter N Helvey
(74) *Attorney, Agent, or Firm* — Mark F. Smith; Smith Brandenburg Ltd.

(57) ABSTRACT

A flexible pouch having a flexible or foldable or collapsible body having an inner liquid tight cavity for containing a liquid and a nozzle for expelling liquid from the inner liquid tight cavity when the flexible pouch is squeezed through a nozzle that discharges the liquid in the form of a spray or mist.

18 Claims, 7 Drawing Sheets

(56) References Cited

U.S. PATENT DOCUMENTS

| | | | | |
|---|---|---|---|---|
| 8,684,241 | B2 * | 4/2014 | Minegishi | B05C 17/005 222/391 |
| 9,296,521 | B2 | 3/2016 | Murray | |
| 9,668,618 | B1 * | 6/2017 | Kassebaum | B65D 83/771 |
| 9,821,284 | B2 * | 11/2017 | Johns | B01F 35/32021 |
| 10,071,837 | B2 * | 9/2018 | Franca | B65D 47/2031 |
| 10,081,486 | B2 * | 9/2018 | Murray | B65D 75/008 |
| D852,646 | S * | 7/2019 | Wiesman | D9/708 |
| 10,399,750 | B1 * | 9/2019 | Latour | B65D 47/0809 |
| 10,954,039 | B1 * | 3/2021 | Iversen | A23K 50/48 |
| 11,104,499 | B2 * | 8/2021 | Mazzola | B65D 35/36 |
| 2003/0006309 | A1 * | 1/2003 | Duqueroie | B05B 11/048 239/327 |
| 2003/0010795 | A1 * | 1/2003 | Duqueroie | B05B 11/048 222/212 |
| 2003/0010844 | A1 * | 1/2003 | Duqueroie | B05B 11/048 239/327 |
| 2003/0062090 | A1 * | 4/2003 | Secondo | B05B 11/0072 137/853 |
| 2008/0063319 | A1 * | 3/2008 | Kuge | B65D 75/008 383/33 |
| 2008/0223677 | A1 * | 9/2008 | Mauro | A45C 5/14 190/102 |
| 2009/0097779 | A1 * | 4/2009 | Branch | B65D 33/2508 383/207 |
| 2010/0072224 | A1 * | 3/2010 | Ha | B65D 47/0842 222/107 |
| 2011/0114759 | A1 * | 5/2011 | Schmitz | B05B 1/1645 239/589 |
| 2011/0180630 | A1 * | 7/2011 | Chang | A47G 19/2266 239/327 |
| 2013/0195382 | A1 | 8/2013 | Murray | |
| 2014/0037807 | A1 * | 2/2014 | Delane | B65D 75/5861 383/42 |
| 2014/0376833 | A1 * | 12/2014 | Lyon | B65D 47/06 222/572 |
| 2018/0360415 | A1 * | 12/2018 | Dohm | A61B 8/4281 |
| 2020/0307885 | A1 * | 10/2020 | Mazzola | B05B 11/047 |

* cited by examiner

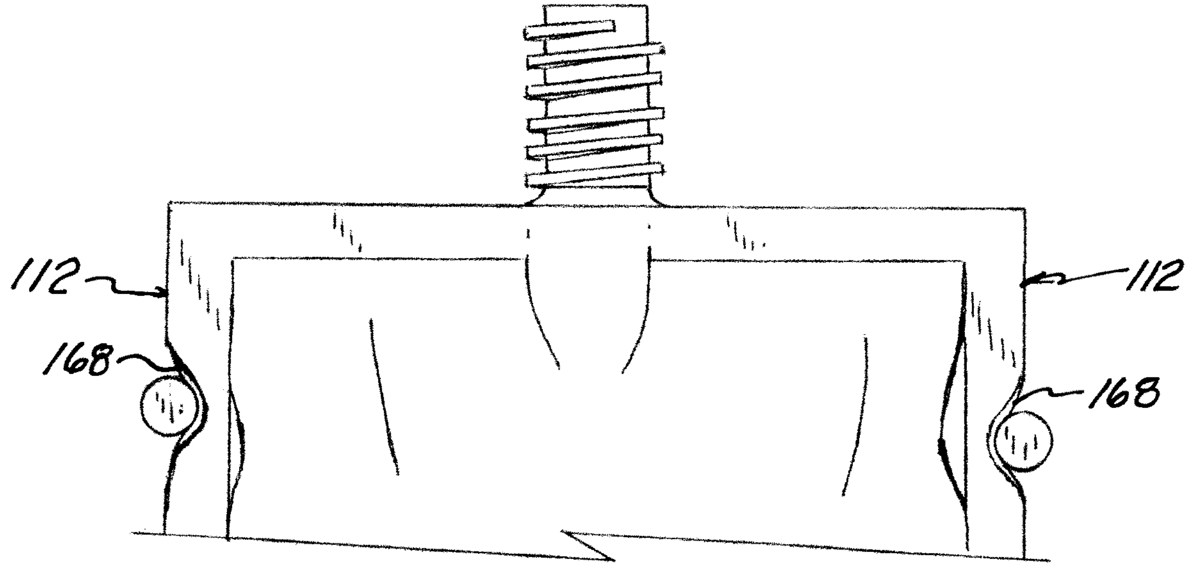
FIG-12
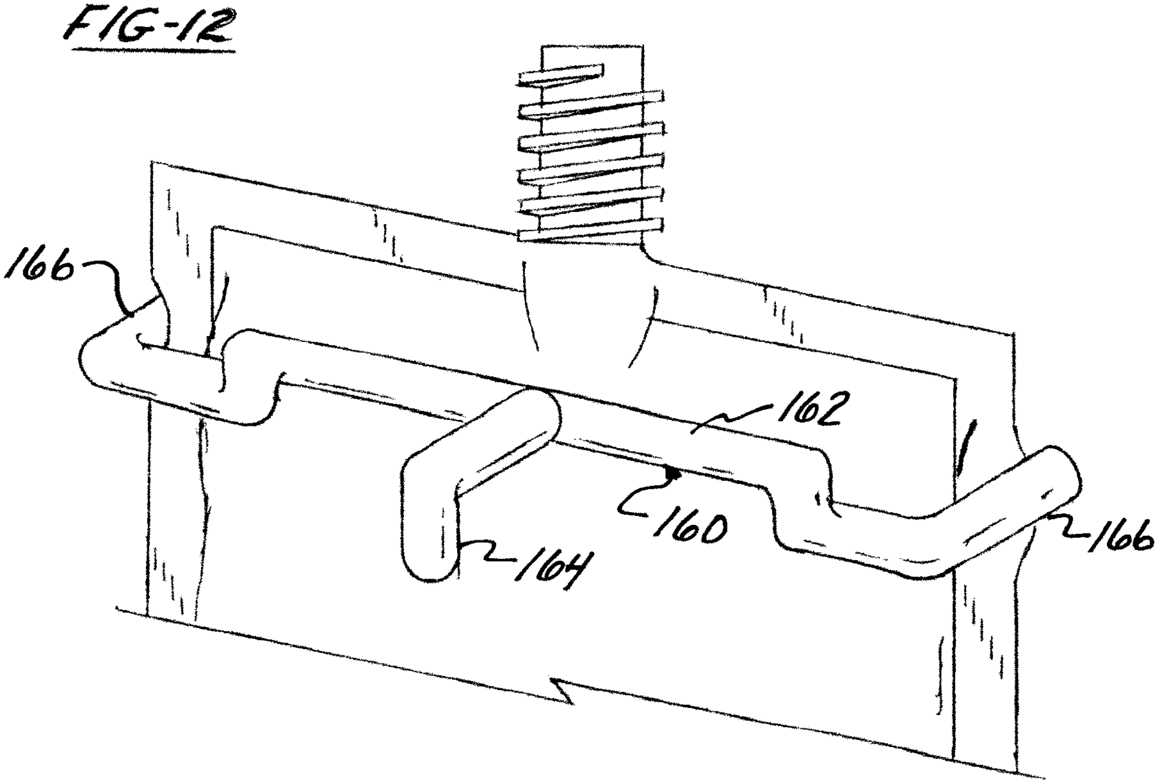

FLEXIBLE POUCH HAVING A NOZZLE

This application claims benefit to U.S. Provisional Patent Application No. 63/347,312 filed May 31, 2022.

BACKGROUND OF THE INVENTION

This invention related to a flexible pouch having at least one nozzle for discharging liquid from the pouch in one or more liquid flow streams. Flexible pouches are known for use in containing, storing and dispersing a variety of liquid products. Such flexible pouches have advantages over relatively rigid plastic and glass containers in that in their empty state they can be stored and shipped in greater numbers in conventional storage and shipping packages than conventional rigid plastic or glass containers. Further, larger numbers of flexible pouches can be stacked and displayed on a store shelf or in a home cabinet in greater numbers than conventional relatively rigid and glass containers containing the same amount of liquid.

While flexible pouches have been developed, including stand-up flexible pouches, that have openings for discharging liquid contained within the pouch, such as by inserting a straw into the inner cavity of the pouch or by use of a liquid discharge attachment or nozzle that operate to discharge the liquid out of the pouch in a constant liquid stream. However, while such flexible pouches operate to provide a constant discharge stream of liquid and may be preferable for some applications, such as liquids for drinking or liquids that are poured into other containers, such pouches are not desirable for certain application of liquids, such as, but not limited to, applications for cleaning surfaces or for use in applying a thin liquid coating on a surface of an article, such as a vegetable oil applying on pans used for cooking. Preferably, such applications benefit when liquids are expelled in the form of a spray or mist. Accordingly, it would be desirable to have a flexible pouch with a liquid discharge nozzle that operates to create a mist or a spray for applications where a constant discharge stream is not preferred. It would also be desirable to have a flexible pouch that can be manufactured in large quantities and then provided with a liquid discharge nozzle that creates a fluid stream that is best suited for a particular liquid being injected into the flexible pouch and the desired use of the liquid thereby reducing overall manufacturing and inventory costs associated with the flexible pouch as well as allowing the same flexible pouch to be used for various liquids and applications.

Various applications often require applying two different types of liquids. For example, shampoos are often followed by the application of a conditioner. Accordingly, it would be desirable to have a flexible pouch that contains two different liquids. Often such liquids are applied using different discharge streams. For example, for a shampoo, it may be desirable to apply the shampoo in the form of a constant liquid stream whereas, for a conditioner, it may be desirable to apply the conditioner in the form of droplets, such as a spray of a mist. Thus, it would be desirable to have a flexible pouch that can contain more than one liquid that can be separated and can be expelled from the pouch in the same or different forms of discharge liquid streams.

Accordingly, it would be desirable to have a flexible pouch for containing one or more liquids which can apply the one or more liquids in the form of a droplet spray. It would also be desirable to have a flexible pouch that can contain more than one liquid, each liquid being separated, and can be expelled in one or more different forms of liquid streams. It would also be desirable to have a flexible pouch that can accommodate different type of liquid discharge nozzles allowing for different forms of liquid discharge streams. It would also be desirable to have a flexible pouch that can be manufactured in large quantities, thereby reducing the manufacturing costs of each flexible pouch and allows a liquid discharge nozzle to be easily attached to the flexible pouch that best accommodates the type of liquid and the desired application. It would also be desirable to have a flexible pouch having a liquid discharge nozzle that can be adjusted to provide a desired liquid stream.

SUMMARY OF THE INVENTION

A preferred embodiment of the subject invention is a flexible pouch comprising a body having an inner liquid tight cavity with an opening and a liquid discharge nozzle attached to the body such that when the flexible pouch is squeezed, liquid contained within the inner liquid tight cavity is forced out through the opening and the liquid discharge nozzle such that the liquid is expelled in the form of a spray or mist or a form as directed by the liquid discharge nozzle.

A preferred embodiment of the invention is a flexible pouch comprising a first panel and a second panel with a gusset extending from the first panel to the second panel forming a bottom; wherein the first panel, the second panel and the gusset are sealed along their outer peripheries forming an inner liquid tight cavity; wherein the flexible pouch further comprises a liquid discharge nozzle attached to a fitment positioned within an opening along a top surface that operates such that liquid contained within the inner liquid tight cavity, when the pouched is squeezed, is expelled out of the inner liquid tight cavity through the opening and the fitment in the form of a liquid stream as directed by the liquid discharge nozzle.

In a preferred embodiment of the invention the liquid discharge nozzle is permanently attached to the flexible pouch.

In a preferred embodiment if the invention the liquid discharge nozzle is removably attached to the flexible pouch.

In a preferred embodiment of the invention, the fitment includes outwardly extending threads that mate with inwardly extending threads in the liquid discharge nozzle for removably attaching the liquid discharge nozzle to the fitment.

In a preferred embodiment of the invention, the liquid discharge nozzle is a spray nozzle having a nozzle tip that operates to expel the liquid contained within the inner liquid tight cavity out of the pouch in the form of a spray or mist liquid stream.

In a preferred embodiment the liquid discharge nozzle is selected from a list of interchangeable liquid discharge nozzles selected from the list of mist discharge nozzles, spray discharge nozzles, continuous stream discharge nozzles, and adjustable discharge nozzles.

In a preferred embodiment of the invention the flexible pouch is a stand-alone flexible pouch.

In a preferred embodiment of the invention the flexible pouch is in the form of a unitary flexible pouch (pouch is constructed having no side, bottom or top seams).

In a preferred embodiment of the invention, the flexible pouch can contract into a flat configuration and expand into an expanded configuration.

In a preferred embodiment of the invention the foldable pouch is a collapsible pouch that can retract into a flat configuration and formed from flexible or bendable or pliable material.

A preferred embodiment of the invention is a flexible pouch comprising a body having an inner liquid tight cavity; an opening in the body and a liquid discharge nozzle, wherein the liquid discharge nozzle is attached to the body and operates such that liquid contained within said inner liquid tight cavity when the pouch is squeezed, is expelled through the opening and the discharge nozzle in the form of a liquid discharge stream as directed by said liquid discharge nozzle.

In a preferred embodiment the liquid discharge nozzle is attached to the body by a fitment and wherein said liquid discharge nozzle is selected from a list of interchangeable liquid discharge nozzles comprising discharge mist nozzles, discharge spray nozzles, continuous stream discharge nozzles, and adjustable liquid stream discharge nozzles.

In another preferred embodiment of the invention, the inner liquid tight cavity includes a dividing wall forming a separate first liquid compartment and a separate second liquid compartment that operate for containing a first liquid and a second liquid, respectively, and wherein the flexible pouch includes a first opening having a first fitment positioned within the opening that cooperates with a first liquid discharge nozzle for expelling a liquid from the first liquid compartment; and a second opening having a second fitment within the second opening that cooperates with a second liquid discharge nozzle for expelling a liquid from the second liquid compartment.

In another preferred embodiment of the invention, the flexible pouch includes a skirt that operates to maintain the flexible pouch in an upright vertical position on a horizontal surface.

In another preferred embodiment of the invention, the skirt includes a flexible skirt strap having first and second ends attached to opposed locations on the skirt that operates to provide support for maintaining the flexible pouch in an upright vertical position on a horizontal surface.

In another preferred embodiment of the invention, the flexible pouch includes at least one window that permits a user to view the amount of liquid within the inner liquid tight cavity.

In another preferred embodiment of the invention the at least one window is in the form of an elongated window that includes a marker that operates such that the user can measure the amount of liquid within the inner liquid tight cavity.

In another preferred embodiment of the invention, the flexible pouch includes a hanger that attaches to a vertical surface and operates to maintain the flexible pouch in a vertical position.

In another preferred embodiment of the invention, the flexible pouch has an outer geometrical shape that cooperates with a hanger attached to a vertical surface for supporting the flexible pouch in a vertical position on the hanger.

A preferred embodiment of the invention is a flexible pouch comprising a first panel and a second panel with a gusset extending from the first panel to the second panel forming a bottom; wherein the first panel, the second panel and the gusset are sealed along their outer peripheries forming an inner liquid tight cavity. The flexible pouch further comprises a liquid discharge nozzle, wherein the liquid discharge nozzle is attached to a fitment positioned within an opening and operates such that liquid contained within the inner liquid tight cavity when the pouch is squeezed, is expelled in the form of a liquid flow stream as directed by the liquid discharge nozzle; wherein the fitment includes outwardly extending threads that mate with inwardly extending threads in the liquid discharge nozzle for removably attaching the liquid discharge nozzle to the fitment; and wherein the liquid discharge nozzle is selected from a list of interchangeable liquid discharge nozzles selected from the list of liquid mist discharge nozzles, liquid spray discharge nozzles, continuous stream liquid discharge nozzles, and adjustable liquid stream discharge nozzles.

These and other benefits, advantages, and embodiments of the invention will be apparent from the following description, the accompanying drawings, and the appended claims.

BRIEF DESCRIPTION OF THE DRAWINGS

Features, aspects, and advantages of the present invention will become better understood with regard to the following description, appended claims, and accompanying drawings where:

FIG. 11 is a schematic partial representation of another preferred embodiment of the flexible pouch and a hanger with horizontally extending base and outwardly parallel extending arms extending horizontally and perpendicularly from the horizontally extending base that contacts the peripheries of the first panel and the second panel for supporting the flexible pouch in a vertical position;

FIG. 12 is a schematic perspective representation of the flexible pouch of FIG. 11 showing the hanger having a hook for attaching the hanger to a vertical surface (not shown).

DETAILED DESCRIPTION OF THE INVENTION

Figure 1:
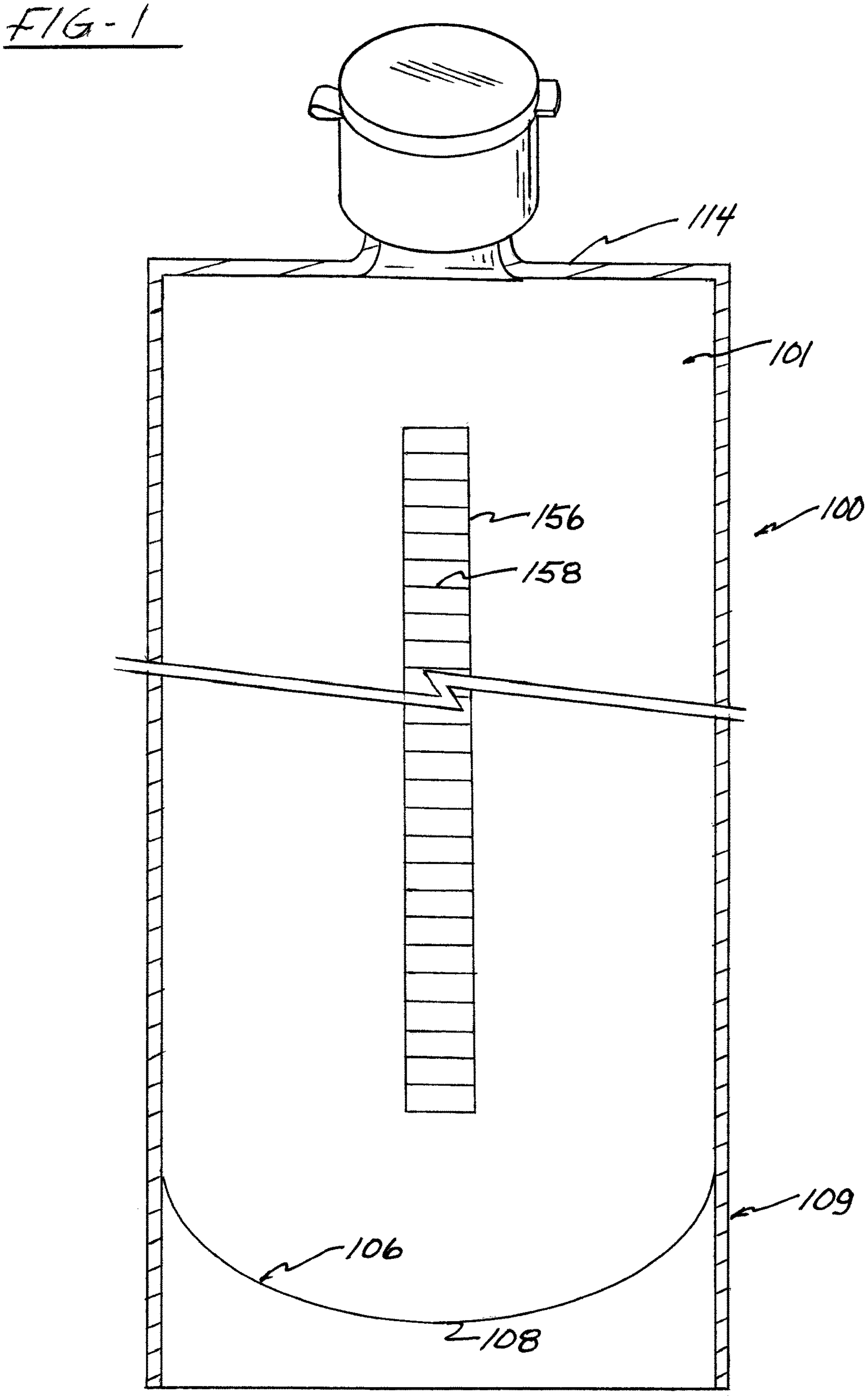
FIG. 1 is a schematic representation of a preferred embodiment of the invention illustrating a flexible pouch having a liquid discharge nozzle with a removable cap and showing an inner liquid tight cavity.

The subject invention is directed to a flexible pouch having a flexible or foldable or collapsible body with an inner liquid tight cavity and a liquid discharge nozzle for expelling liquid from the inner liquid tight cavity, when the flexible pouch is squeezed, through the liquid discharge nozzle that discharges the liquid in the form of a spray or mist. In a preferred embodiment, the flexible pouch has a first panel, a second panel and a gusset all formed from one or more sheets of material that are sealed together to form a body having an inner liquid tight cavity for containing a volume of liquid. The flexible pouch includes an opening having a fitment that operates to expel liquid contained within the inner liquid tight cavity. A liquid discharge nozzle is mounted to the fitment and operates to discharge liquid from the inner liquid tight cavity in the form of a liquid stream as directed by the liquid discharge nozzle. As will be shown, the subject invention provides a flexible pouch for containing one or more liquids which can apply the one or more liquids in the form of a droplet spray onto a surface. In a preferred embodiment of the invention, the flexible pouch contains more than one liquid, each liquid being separated, and whereby each separated liquid can be discharged from the flexible pouch in one or more different forms of liquid streams. In another preferred embodiment of the invention, the flexible pouch can accommodate various types of liquid discharge nozzles that allow liquid to be discharged from the flexible pouch in different forms of liquid discharge streams. It will also be apparent that the flexible pouch of the subject invention can be manufactured in large quantities, thereby reducing the manufacturing costs of each flexible pouch, allows the flexible pouch to collapse into a flat configuration (a smaller configuration) permitting a larger number of flexible pouches to be packaged, and allows a liquid discharge nozzle to be selected for properly discharging the type of liquid contained within the flexible pouch and can be easily attached to the flexible pouch. Thus, the liquid discharge nozzle can be selected that best accommodates the type of liquid and provides the proper form of liquid stream for the desired application. In a preferred embodiment of the invention, the liquid discharge nozzle can be adjusted to provide a desired form of liquid stream.

It should be understood that the following description is made with reference to accompanying drawings which form part of the description and which show by way of illustration possible implementations of the system of the subject application. It should also be understood that other implementations may be utilized and structurally, as well as procedural, changes may be made without departing from the scope of the invention. It will also be apparent that changes may be made in the function and/or arrangement of elements described in the disclosed exemplary implementations without departing from the scope of the invention.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein the term vertical refers to the direction perpendicular to the ground, a table or a shelf supporting the flexible pouch. The term "horizontal" refers to the direction parallel to the ground, a table or a shelf supporting the flexible pouch. The term "spray" refers to liquid being blown by air in the form of droplets. The term "mist" refers to droplets of liquid that are smaller in size than the droplets forming a spray such that they can be suspended in air. The term "expanded configuration" refers to the flexible pouch that is filled or partially filled with a liquid volume and the term "flat configuration" refers to the flexible pouch when it is compressed or folded when there is no liquid volume in the flexible pouch and the volume of the flexible pouch is smaller than when the flexible pouch is in its expanded configuration. The term "downwardly" refers to the direction away from the horizontally extending top side towards the bottom, as described herein.

Figure 2:
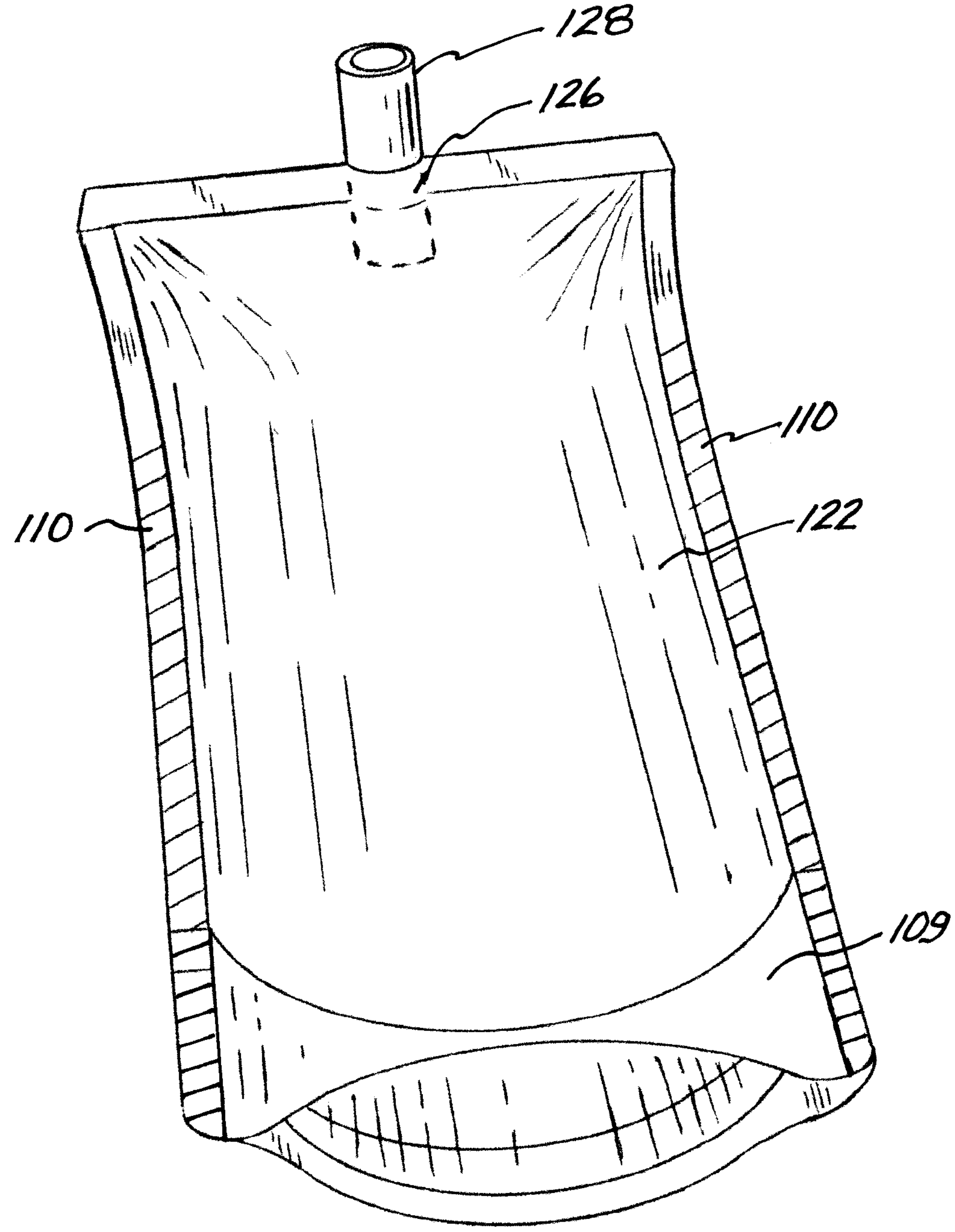
FIG. 2 is a schematic perspective representation of the flexible pouch of FIG. 1, showing the first panel, a second panel and a gusset sealed along their outer peripheries forming an inner liquid tight cavity and a fitment positioned within an opening along the top side of the flexible pouch for attaching a liquid discharge nozzle thereon.
Figure 3:
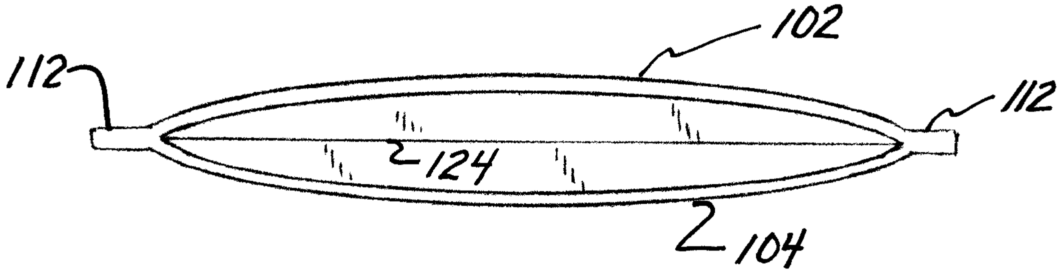
FIG. 3 is a schematic representation of the bottom view of the flexible pouch of FIG. 1 in its flat configuration (the inner liquid tight cavity containing no volume of liquid) having a first panel, a second panel and a gusset sealed along their outer peripheries.
Figure 4:
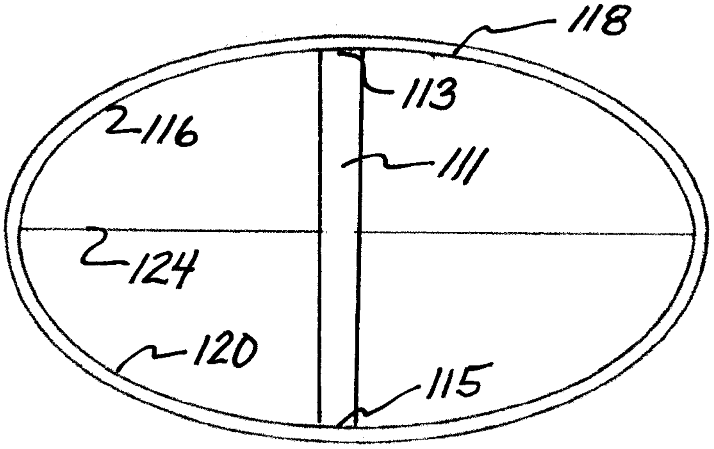
FIG. 4 is a schematic representation showing the bottom view of the flexible pouch of FIG. 1 in its expanded configuration (the inner liquid tight cavity containing a volume of liquid)

Referring to FIGS. 1-4, a preferred embodiment of the flexible pouch 100 is shown having a body 101 formed from a first panel 102, a second panel 104 and a gusset 106 positioned between the first panel 102 and the second panel 104 forming a bottom 108. The first panel 102 and the second panel 104 are aligned and sealed along their outer peripheries 110 forming vertically extending opposed sides 112 and a horizontally extending top side 114. The gusset 106 includes an outer periphery 116 that is sealed along the inner surface 118 of the first panel 102 and the inner surface of the 120 of the second panel 104 forming the liquid tight bottom 108. The vertically extending opposed sides 112 together with the horizontally top side 114 and the gusset 106 form an inner liquid tight cavity 122 within the flexible pouch 100. In a preferred embodiment of the invention, the gusset 106 includes a central fold line 124 that allows the gusset 106 to fold along the central fold line 124 such that when the inner liquid tight cavity 122 is empty, thereby allowing the pouch 100 to collapse into a relatively flat configuration, as illustrated in FIG. 3, as well as allowing the gusset 106 to fold along the central fold line 124 when the pouch 100 expands into an expanded configuration when the inner liquid tight cavity 124 is filled with a volume of liquid, as illustrated in FIG. 4.

In a preferred embodiment, the vertically extending opposed sides 112, as shown in FIGS. 1 and 2, extend downwardly past the liquid tight bottom 108 forming a skirt 109. Preferably, the skirt 109 includes a flexible skirt strap 111 having first and second ends 113, 115, respectively, attached to opposed locations on the skirt 109 that operates to provide support to the skirt 109 for maintaining the flexible pouch in an upright vertical position on a horizontal surface (not shown), such as a shelf.

The first panel 102, the second panel 104 and the gusset 106 are preferably formed from one or more sheets of material formed from, but not limited to, material such as polyethylene terephthalate (PET), polypropylene (PP), biaxially orient polypropylene (BOPP) polyester, or a FDA approved resilient plastic material such as for use for water containers, or aluminum foil panels but can be formed from other materials known to be suitable to one skilled in the art for forming pouches for containing liquids. The first panel 102, the second panel 104 and the gusset 106 are preferably sealed together such as by use of heat and pressure, ultrasonic welding but can be sealed using any other method known to be suitable to one skilled in the art for sealing the one or more sheets of material forming the pouch.

Figure 5:
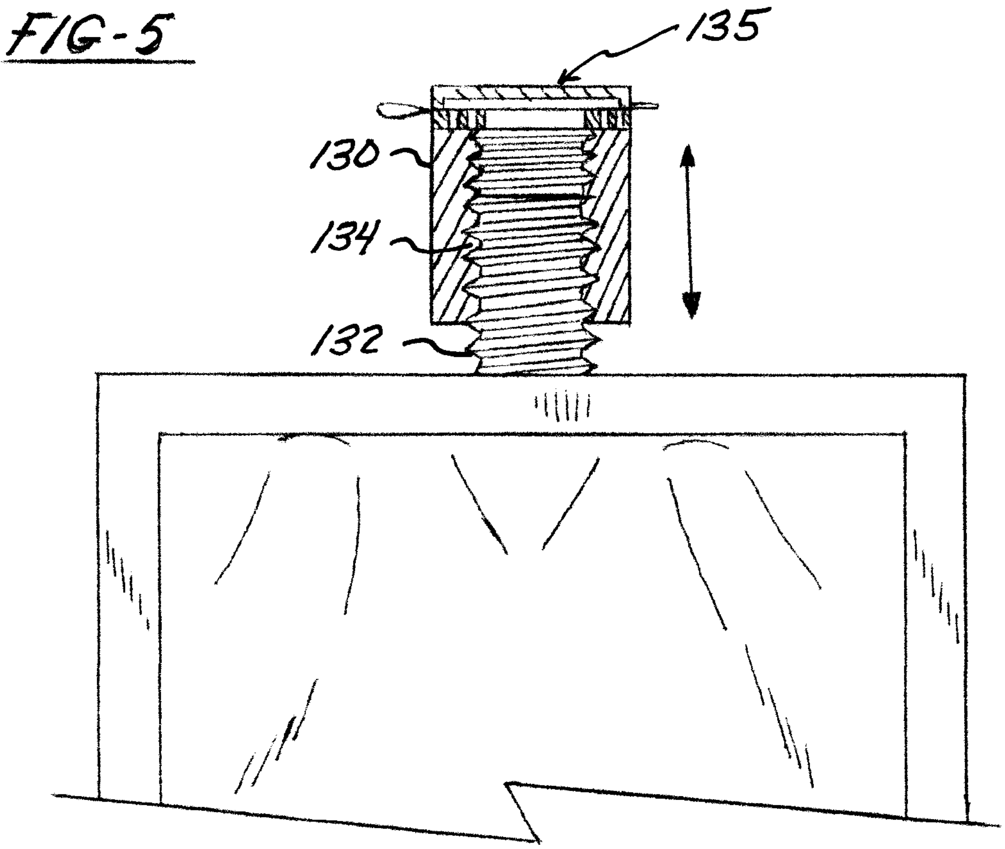
FIG. 5 is a schematic representation showing a partial view of a preferred embodiment of the flexible pouch showing a fitment having a removable liquid discharge nozzle attached thereto.

As shown, the flexible pouch 100 includes an opening 126 having a fitment 128 that operates to expel liquid contained within the inner liquid tight cavity 122. A liquid discharge nozzle 130 is mounted to the fitment 128 and operates to discharge liquid from the inner liquid tight cavity 122 in the form of a liquid stream as directed by the liquid discharge nozzle 130. In a preferred embodiment, the opening 126 and the fitment 128 are positioned along the horizontal extending top side 114, but it should be understood that the opening 126 and the fitment 128 can be positioned along the face of the first panel 102 or the face of the second panel 104. As illustrated in FIG. 5, the fitment 128 includes outwardly extending threads 132 that mate with corresponding inwardly extending threads 134 along the liquid discharge nozzle 130 for removably attaching the liquid discharge nozzle 130 to the fitment 128. It should now be understood that the threads of the fitment can be inwardly extending threads that mate with corresponding outwardly threads of the liquid discharge nozzle. It should also be understood that other methods of attaching the liquid discharge nozzle to the fitment can be utilized, such as, but not limited to, a snap-on nozzle and fitment or a frictional fit nozzle and fitment, or other methods of removable attaching the liquid discharge nozzle to a fitment can be utilized. It should also be understood that in a preferred embodiment of the invention, the liquid discharge nozzle is permanently attached to the fitment. In a preferred embodiment, the liquid discharge nozzle 130 is removably attached to the fitment so that other liquid discharge nozzles can be selected and attached to the fitment 128 to provide different forms of liquid discharge streams. For a non-limiting example, such liquid discharge nozzles are selected from a list of liquid discharge nozzles that operate to provide various forms of liquid discharge streams and includes mist discharge nozzles that expel liquid in the form of fine droplets creating a mist, spray discharge nozzles that expel liquid in the form of droplets (such droplets are larger than the droplets created by a discharge mist nozzle) creating a spray, continuous stream discharge nozzles that discharge liquid in the form of a continuous stream, and adjustable flow discharge nozzles that operate to allow a user to select the form of the expelled fluid stream. It should also be understood that such liquid discharge nozzles for use on various hand-held liquid containers for providing various forms of liquid streams are well known in the art. It should now be apparent to one skilled in the art that unlike prior art flexible pouches for storing and discharging liquids having openings for inserting straws for drinking or have only a liquid discharge nozzle for discharging liquid in the flow of a continuous stream, the flexible pouch of a preferred embodiment of the subject invention uses interchangeable discharge nozzles that allow a user to select the particular liquid discharge nozzle for discharging liquid in a desired liquid stream. Preferably, the liquid discharge nozzles disclosed herein are each provided with a closure 135, such as in the form of a flip cap (as shown) or a removable top (such as a slide-on cap). It should be understood that various types of closures can be used for creating a cover over the nozzle tip(s) or a closure that reduces the likelihood of fluid leakage out of the fluid discharge nozzle during non-use of the flexible pouch.

Figure 6:
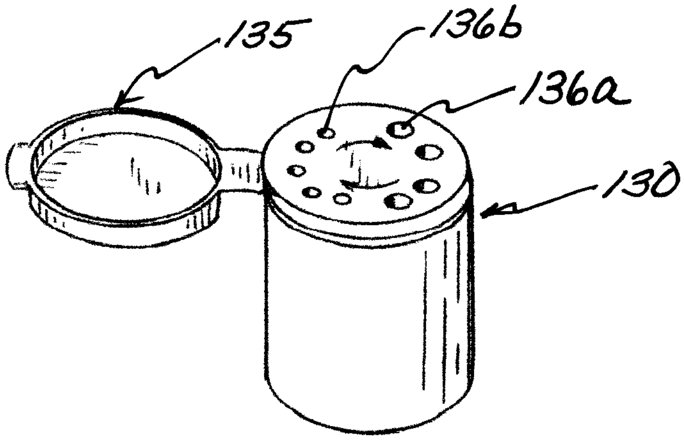
FIG. 6 is a schematic perspective representation showing a liquid discharge nozzle in the form of an adjustable liquid flow nozzle having a plurality of nozzle tips for expelling liquid in the form of droplets creating a spray and a plurality of nozzle tips for expelling liquid in the form of smaller droplets creating a mist.
Figure 7:
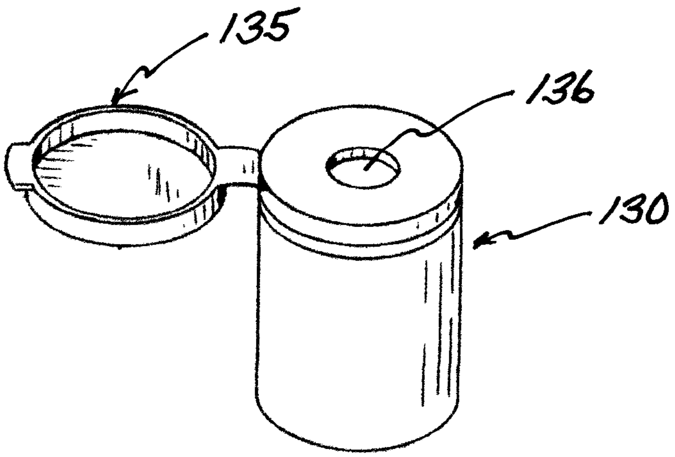
FIG. 7 is a schematic perspective representation showing a liquid discharge nozzle in the form of a liquid spray discharge nozzle having a nozzle tip for expelling liquid in the form of droplets creating a spray.
Figure 8:
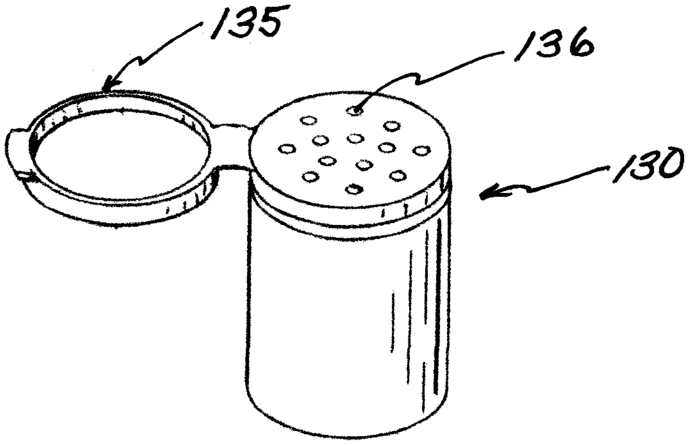
FIG. 8 is a schematic perspective representation showing a liquid discharge nozzle in the form of a liquid spray discharge nozzle having a plurality of nozzle tips for expelling liquid in the form of droplets creating a mist.

In a preferred embodiment of the invention, as illustrated in FIGS. 6-8, the liquid discharge nozzle 130 utilized by the subject invention includes one or more nozzle tips 136 that operates to discharge liquid contained within the inner liquid tight cavity 122 in the form of a liquid stream, such as a mist or spray for distributing the liquid onto a surface in the form of droplets. It should now be apparent to one skilled in the art that unlike flexible pouches that discharge liquid in the form of a continuous stream, a preferred embodiment of the flexible pouch of the subject invention operates to produce a liquid stream in the form of a mist or spray which is desirable for applying liquids for various applications, such as for applying cleaning liquids (glass cleaning liquids, bathroom cleaning liquids, grease cleaning liquids, etc.), and for other liquids such as for coating a surface or for other applications where the application of a liquid in the form of droplets is desirable.

In another preferred embodiment of the invention, as shown in FIG. 6, the liquid discharge nozzle 130 is an adjustable liquid discharge nozzle mounted onto the fitment 128 (FIG. 5). As illustrated, the liquid discharge nozzle 130 includes one or more nozzle tips 136 that operate to produce a discharge fluid stream in the form of droplets creating a spray and includes one or more nozzle tips 136 that operate to produce a discharge fluid stream in the form of smaller droplets (droplets smaller than the droplets creating a spray) creating a mist. In a preferred embodiment, as illustrated in FIG. 6, the nozzle tips sized for creating a spray 136*a* can be activated (placed in flow communication with the liquid contained within the inner liquid tight cavity) by turning the liquid discharge nozzle in one direction which deactivates the nozzle tips sized for producing a mist 136*b* (placing the nozzle tips out of flow communication with the liquid contained within the inner liquid tight cavity), thereby causing the liquid being discharged from the flexible pouch to be in the form of a spray. By turning the liquid discharge nozzle in the opposite direction, the nozzle tips produce a spray are deactivated and the nozzle tips creating a mist are activated, thereby causing the liquid being discharged from the flexible pouch to be in the form of a mist. It should be understood that liquid discharge nozzles having other types of flow tips (or sizes) can be utilized that provide different forms of discharge fluid streams. It should also be understood that other forms of adjustable liquid discharge nozzles known to one skilled in the art used for discharging fluid from hand-held fluid containers may be utilized.

In another preferred embodiment of the invention, as shown in FIG. 7, the liquid discharge nozzle 130 includes a single nozzle tip 136 sized to produce a spray or sized to produce a mist is shown. In another preferred embodiment of the invention, as shown in FIG. 8, the liquid discharge nozzle 130 includes a plurality of nozzle tips sized to create a liquid stream in the form of a spay or sized to form a liquid stream in the form of a mist.

Figure 9:
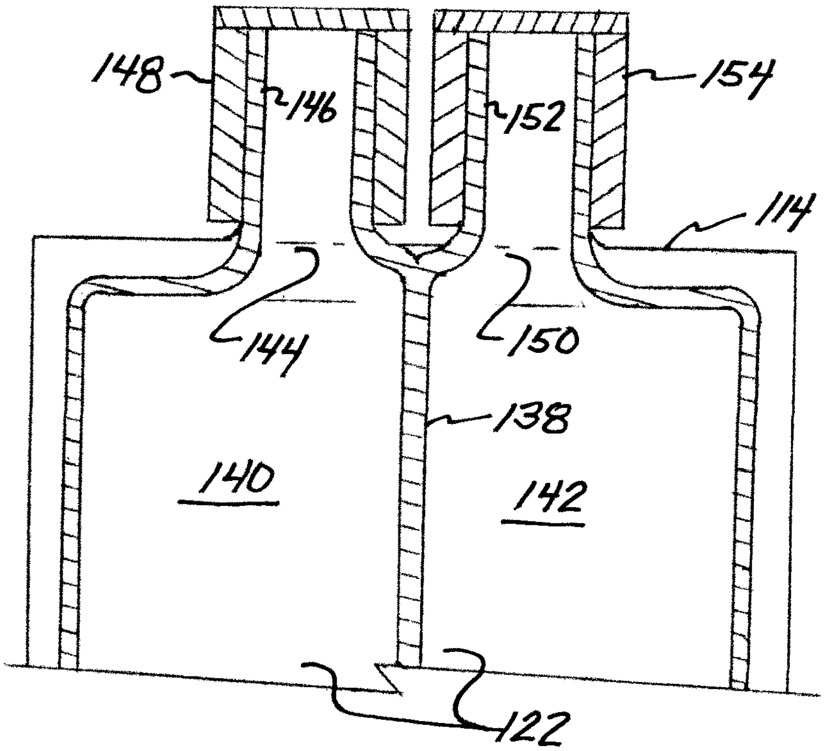
FIG. 9 is a schematic partial representation of another preferred embodiment of the flexible pouch showing the inner liquid tight cavity having a dividing wall for separating the inner liquid tight cavity forming a first liquid section and a second liquid section and each having a fitment and a liquid discharge nozzle for expelling liquid from the first liquid section and the second liquid section.
Figure 10:
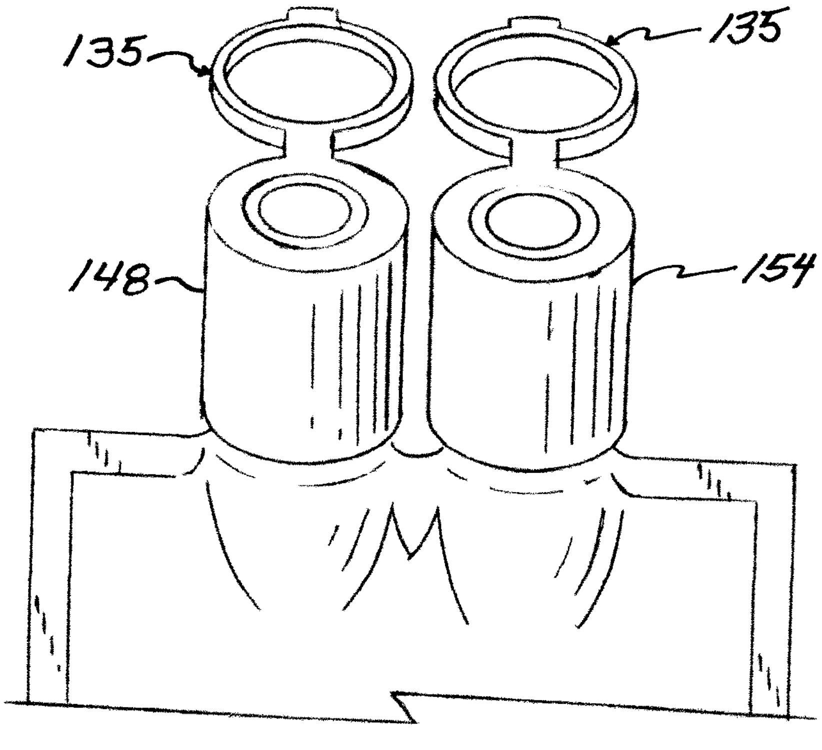
FIG. 10 is a schematic partial perspective representation of the flexible pouch of FIG. 9 showing a nozzle tip of the liquid discharge nozzle for expelling liquid from the first compartment in the form of a continuous liquid stream and a nozzle tip of the liquid discharge nozzle for expelling liquid from the second compartment in the form of a spray.

In another preferred embodiment of the invention, as illustrated in FIG. 9, the inner liquid tight cavity 122, includes a flexible dividing wall 138, that operates to divide the inner liquid tight cavity 122 into a first liquid compartment 140 and a second liquid compartment 142. In a preferred embodiment, the flexible dividing wall 138 operates to prevent liquid contained within the first liquid compartment 140 from mixing with the liquid contained in the second liquid compartment 142. As shown, the first liquid compartment 140 includes an opening 144 having a fitment 146 that operates to discharge liquid contained within the first liquid compartment 140. A liquid discharge nozzle 148 is mounted to the fitment 146 and operates to discharge liquid from the first liquid compartment 140 in a liquid stream in a form as directed by the liquid discharge nozzle 148 (as described above). In a preferred embodiment, the opening 144 and the fitment 146 are positioned along the horizontal extending top side 114 such that it is in communication with the liquid contained in the first liquid compartment 140. However, it should be understood that the opening 144 and the fitment 146 can be positioned along the face of the first panel 102 or the face of the second panel 104 such that the opening 144 and the fitment 146 are in communication with the liquid contained in the first liquid compartment 140. The second liquid compartment 142 includes an opening 150 having a fitment 152 that operates to discharge liquid contained within the second liquid compartment 142. A liquid discharge nozzle 154 is mounted to the fitment 152 and operates to discharge liquid from the second liquid compartment 142 in the form of a liquid stream as directed by the liquid flow nozzle 154 (as described above). In a preferred embodiment, the opening 150 and the fitment 152 are positioned along the horizontal extending top side 114 such that it is in communication with the liquid contained in the second liquid compartment 142 but it should be understood that the opening 150 and the fitment 152 can be positioned along the face of the first panel 102 or the face of the second panel 104 such that the opening 150 and the fitment 152 are in communication with the liquid contained in the second first liquid compartment 142.

Referring to FIG. 1, another preferred embodiment of the flexible pouch is shown where the body 101 of the flexible pouch 100 includes one or more transparent windows 156 that operate to permit the user to look into the inner liquid tight cavity 122 to determine the amount of liquid inside the inner liquid tight cavity 122. In another preferred embodiment of the invention the one or more windows 156, as shown, is an elongated window such that it runs vertically along the body 101 of the flexible pouch 101 and includes markers 158 that together with the elongated window 156 operate to permit the user to measure the amount of liquid contained within the inner liquid tight cavity 122.

Referring to FIGS. 11 and 12, another preferred embodiment of the flexible pouch 100 of the subject invention is shown having an outer geometrical contoured shape vertically extending opposed sides 112 forming a generally hourglass contour. As illustrated, in a preferred embodiment the flexible pouch includes a hanger 160 having a horizontally extending base 162, an outwardly extending connector 164 and outwardly parallel extending arms 166 that extending horizontally and perpendicularly from the horizontally extending base 162. As shown, the connector 164 is in the form of a hook or another form for attaching the hanger 160 to a vertical surface (not shown). The arms 166 are horizontally separated such that the flexible pouch 100 extends vertically between the arms 166 and engages the arms at engagement points 168 along the outer peripherie(s) of the body 101 of the flexible pouch 100 such that the arms operate to hold the flexible pouch 100 in a vertical position.

In another preferred embodiment of the invention, the flexible pouch 100 is formed as a unitary flexible pouch (pouch is constructed having no side, bottom or top seams), a foldable pouch formed from first and second panels, 102, 104, respectively, and a gusset 106 as described above, or a collapsible pouch formed from flexible or bendable or pliable materials such as, but not limited to, silicone, Polyolefin (POL), low density polyethylene (LDPE), Polyethylene terephthalate (PET, PETE), Polypropylene (PP), and Polyvinylchloride (PVC, Vinyl) that permits the flexible pouch to be folded or compressed. It should be understood that the material selected and the construction of the flexible pouch is selected based on various factors including, but not limited to, the type of liquid to be contained in the flexible pouch, the use of the flexible pouch, and the application of the liquid contained within the flexible pouch.

It should now be understood that a preferred embodiment of the invention is a flexible pouch having a body with in inner liquid tight cavity therein with one or more openings and one or more liquid discharge nozzles such that when pressure is applied by a user, liquid contained within the inner liquid tight cavity is expelled through the opening and discharged by a liquid discharge nozzle in the form of a spray or mist. In one preferred embodiment, the one or more liquid discharge nozzles is removably attached to the body, such as by a fitment, and in another preferred embodiment the one or more liquid discharge nozzle is permanently attached to the body. In another preferred embodiment the one or more liquid discharge nozzle is an adjustable liquid discharge nozzle.

It should now also be understood that in a preferred embodiment of the invention the flexible pouch comprises a first panel and a second panel with a gusset extending from the first panel to the second panel forming a bottom. The first panel, the second panel and the gusset are sealed along their outer peripheries forming an inner liquid tight cavity. A liquid discharge nozzle is attached to a fitment positioned within an opening along a top side of the flexible pouch such that liquid contained within the inner liquid tight cavity when the pouch is squeezed or the liquid contained within the inner liquid tight cavity is pressurized by a user, the liquid will be expelled out of the pouch through the opening and the fitment and discharged in the form of a liquid stream as directed by the liquid discharge nozzle. Preferably, the liquid discharge nozzle is removably attached to the fitment. In another preferred embodiment, the liquid discharge nozzle is permanently attached to the fitment. In a preferred embodiment of the invention, the liquid discharge nozzle is a liquid spray discharge nozzle having a nozzle tip that operates to discharge the liquid contained within the inner liquid tight cavity out of the flexible pouch in the form of a spray or mist. In another preferred embodiment of the invention the liquid discharge nozzle is selected from a list of interchangeable liquid discharge nozzles comprising liquid mist discharge nozzles, liquid spray discharge nozzles, continuous liquid stream discharge nozzles, and adjustable liquid discharge nozzles. In another preferred embodiment of the invention the flexible pouch is a stand-alone flexible pouch.

In another preferred embodiment of the invention, the inner liquid tight cavity includes a dividing wall forming a separate first liquid compartment and a separate second liquid compartment that operate to contain and separate liquid within the inner liquid tight cavity. The flexible pouch includes a first opening having a first fitment positioned within the opening that cooperates with a first liquid discharge nozzle for discharging a liquid from the first liquid compartment; and a second opening having a second fitment within the second opening that cooperates with a second liquid discharge nozzle for discharging a liquid from the second liquid compartment.

In another preferred embodiment of the invention, the flexible pouch includes a skirt that operates to maintain the flexible pouch in an upright vertical position on a horizontal surface. In another preferred embodiment of the invention, the flexible pouch includes at least one window that permits a user to view the amount of liquid within the inner liquid tight cavity. In another preferred embodiment of the invention the at least one window is in the form of an elongated window that includes a marker that operates such that the user can measure the amount of liquid within the inner liquid tight cavity.

In another preferred embodiment of the invention, the flexible pouch has an outer geometrical shape that cooperates with a hanger attached to a vertical surface for supporting the flexible pouch in a vertical position on the hanger.

A preferred embodiment of the invention is a flexible pouch comprising a first panel and a second panel with a gusset extending from the first panel to the second panel forming a bottom; wherein the first panel, the second panel and the gusset are sealed along their outer peripheries forming an inner liquid tight cavity, the flexible pouch further comprising a liquid discharge nozzle, wherein the liquid discharge nozzle is attached to a fitment positioned within an opening such that liquid contained within the inner liquid tight cavity when the pouched is squeezed, is discharged in the form of a liquid stream as directed by the liquid discharge nozzle; wherein the fitment includes threads that mate with threads in the liquid discharge nozzle for removably attaching the liquid discharge nozzle to the fitment; and wherein the liquid discharge nozzle is selected from a list of interchangeable liquid discharge nozzles selected from the list of liquid mist discharge nozzles, liquid spray discharge nozzles, continuous liquid stream discharge nozzles, and adjustable liquid discharge nozzles.

In another preferred embodiment of the invention, the flexible pouch is in the form of a collapsible pouch that can be pressed to compress the pouch for expelling liquid contained within the inner liquid tight cavity out through an opening for discharge by the liquid discharge nozzle in the form of a spray or mist and which allows the flexible pouch to be in a compressed configuration when the inner liquid tight cavity if devoid of liquid, such as for shipping, or is in the form of a unitary flexible pouch (pouch is constructed having no side, bottom or top seams) that can be squeezed for causing liquid within the inner liquid tight cavity to be expelled out through an opening for discharging the liquid through a liquid discharge nozzle in a liquid stream in the form of a spray or mist, a foldable pouch that can be squeezed to expel liquid contained in the inner liquid tight cavity out through an opening for discharge by a liquid discharge nozzle in the form of a spray or mist liquid stream and which can be folded when the inner liquid tight cavity is devoid of liquid, such as for shipping.

It should now be apparent that the flexible pouch of the subject invention provides a container for liquids whereby liquids contained within the flexible pouch can be expelled from the pouch and discharged through one or more liquid discharge nozzles in the form of a spray or mist, or another type of fluid stream. The liquid discharge nozzle can be permanently attached to the pouch or can be removably attached to the pouch so that other liquid discharge nozzles, producing different forms of liquid streams can be utilized. It should also be apparent that the flexible pouch of the subject invention can be placed into a flat configuration when the inner liquid tight cavity has no or little liquid within the cavity, such as for shipment, thereby allowing a larger number of flexible pouches to be shipped within the same shipping container than non-flexible containers (such s less pliable plastic containers or glass containers), thereby significantly reducing shipping costs. It should also now be apparent that the flexible pouch of the subject invention can be manufactured in large numbers, thereby reducing manufacturing costs, and a liquid discharge nozzle can be selected that provides the desired liquid discharge stream for the particular liquid that will be contained within the inner liquid tight cavity and/or application. For example, a large quantity of flexible pouches can be manufactured and stored in its flat configuration (thereby reducing the amount of storage space compared to containers that cannot be placed into a flat configuration). When the flexible pouch is selected for use in containing a particular liquid, the desired liquid discharge stream can be selected for the particular liquid and application and a liquid discharge nozzle can then be selected that operates to discharge the liquid from the pouch in the desired liquid discharge stream. Thus, the same flexible pouch can be used for various liquids and applications.

The invention claimed is:

1. A flexible pouch for storing and discharging a liquid, the flexible pouch comprising:

a first panel;

a second panel;

a gusset extending from said first panel to said second panel forming a bottom;

wherein said first panel, said second panel and said gusset are sealed along their outer peripheries forming an inner liquid tight cavity;

wherein the flexible pouch further comprises a plurality of individual removable liquid discharge nozzles, each configured to be selectively attached to and detached from a fitment positioned within an opening along a top surface of the pouch wherein each said liquid discharge nozzle includes a structurally distinct nozzle tip, including a nozzle tip that produces a discharge fluid stream in the form of a continuous stream, a nozzle tip that produces a discharge fluid stream in the form of droplets creating a spray and a nozzle tip that produces a discharge fluid stream in the form of smaller droplets than said droplets creating a spray thereby creating a mist;

wherein when the flexible pouch is squeezed, liquid within said inner liquid tight cavity is expelled out of said inner liquid tight cavity through said opening, said threaded fitment and a selected liquid discharge nozzle to produce a corresponding discharge fluid stream.

2. The flexible pouch of claim 1, wherein said liquid discharge nozzle is removably attached to said fitment.

3. The flexible pouch of claim 1, wherein the flexible pouch is a stand-alone flexible pouch.

4. The flexible pouch of claim 1, wherein said inner liquid tight cavity includes a dividing wall forming a separate first liquid compartment and a separate second liquid compartment that operate for containing a first liquid and a second liquid, respectively, and wherein the flexible pouch includes a first opening having a first fitment positioned within the opening that cooperates with a first liquid discharge nozzle having a first selected nozzle tip that discharges liquid from said first liquid compartment in the form of a continuous stream or in the form of a spray or in the form of a mist depending on the selected nozzle tip and a second opening having a second fitment within the second opening that cooperates with a second liquid discharge nozzle having a second nozzle tip that discharges liquid from said second liquid compartment in the form of a continuous stream or in the form of a spray or in the form of a mist depending or the selected nozzle tip.

5. The flexible pouch of claim 1, further comprising a skirt that maintains the flexible pouch in an upright vertical position on a horizontal surface.

6. The flexible pouch of claim 5, wherein said skirt includes a strap having first and second ends attached to opposed locations on said skirt that provides support for maintaining the flexible pouch in an upright vertical position on the horizontal surface.

7. The flexible pouch of claim 1 further comprising at least one window that permits a user to view the amount of liquid within said inner liquid tight cavity.

8. The flexible pouch of claim 1, wherein the flexible pouch includes a hanger and wherein said flexible pouch has an outer geometrical shape that cooperates with said hanger when said hanger is attached to a vertical surface for supporting the flexible pouch in a vertical position on said hanger.

9. A flexible pouch comprising:

a first panel;

a second panel;

a gusset extending from said first panel to said second panel forming a bottom;

wherein said first panel, said second panel and said gusset are sealed along their outer peripheries forming an inner liquid tight cavity;

a liquid discharge nozzle, wherein said liquid discharge nozzle is removably attached to a fitment positioned within an opening such that liquid contained within said inner liquid tight cavity when the pouch is squeezed, is discharged in the form of a liquid discharge stream as directed by said liquid discharge nozzle; and wherein said liquid discharge nozzle includes one or more interchangeable structurally distinct nozzle tips effective for expelling said discharge stream, wherein one said nozzle tip is effective for discharging a fluid stream in the form of a continuous stream, one said discharge tip is effective for discharging a fluid stream in the form of droplets creating a spray and one said discharge tip is effective for discharging a fluid stream in the form of smaller droplets creating a mist.

10. The flexible pouch of claim 9, wherein the flexible pouch is a stand-alone flexible pouch.

11. The flexible pouch of claim 9, wherein said inner liquid tight cavity includes a dividing wall forming a separate first liquid compartment and a separate second liquid compartment wherein each liquid compartment each having a structurally distinct nozzle having a selected nozzle tip.

12. The flexible pouch of claim 9, further comprising a skirt that operates to maintain the flexible pouch in an upright vertical position on a horizontal surface.

13. The flexible pouch of claim 12, wherein said skirt includes a flexible skirt strap having first and second ends attached to opposed locations on said skirt that operates to provide support for maintaining the flexible pouch in an upright vertical position on a horizontal surface.

14. The flexible pouch of claim 9 further comprising at least one window that permits a user to view the amount of liquid within said inner liquid tight cavity.

15. A flexible pouch comprising:

a body having an inner liquid tight cavity;

a liquid discharge nozzle, wherein said liquid discharge nozzle is removably attached to said body, wherein said liquid discharge nozzle is an adjustable discharge nozzle having selectable nozzle tips and operates such that when liquid contained within said inner liquid tight cavity is pressurized by a user, is discharged in the form of a liquid discharge stream as directed by a selected nozzle tip;

wherein said liquid discharge nozzle is adjustable such that the liquid contained within said inner liquid tight cavity is discharged through a plurality of selected nozzle tips, whereby said selected nozzle tips produced said liquid discharge stream in the form of a continuous stream and/or a liquid discharge stream in the form of droplets creating a spray and/or a liquid discharge stream in the form of droplets creating a mist.

16. The flexible pouch of claim 15 is foldable or bendable or collapsible having the ability to expand into an expanded configuration when liquid is contained in said inner liquid tight cavity and has the ability to contract into a flat configuration when liquid in said inner liquid tight cavity is removed.

17. The flexible pouch of claim 15 wherein said liquid discharge nozzle is removable attached to said body.

18. The flexible pouch of claim 15 wherein said flexible pouch is flexible or foldable or collapsible.

* * * * *